United States Patent
Zheng et al.

(10) Patent No.: US 12,119,868 B2
(45) Date of Patent: Oct. 15, 2024

(54) OPTICAL NETWORK SYSTEM, MANAGEMENT DEVICE, OPTICAL TRANSMISSION APPARATUS, AND COMMUNICATIONS DEVICE

(71) Applicant: HUAWEI TECHNOLOGIES CO., LTD., Guangdong (CN)

(72) Inventors: Jianyu Zheng, Wuhan (CN); Yu Tian, Dongguan (CN); Shimin Gao, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 9 days.

(21) Appl. No.: 17/972,823

(22) Filed: Oct. 25, 2022

(65) Prior Publication Data

US 2023/0127899 A1 Apr. 27, 2023

(30) Foreign Application Priority Data

Oct. 26, 2021 (CN) .......................... 202111248581.7
Dec. 6, 2021 (CN) .......................... 202111481708.X (51) Int. Cl.
*H04B 10/077* (2013.01)
*H04B 10/032* (2013.01)

(52) U.S. Cl.
CPC ....... *H04B 10/0771* (2013.01); *H04B 10/032* (2013.01)

(58) Field of Classification Search
CPC .......................... H04B 10/0771; H04B 10/032
USPC .......................................................... 398/28
See application file for complete search history.

(56) References Cited

U.S. PATENT DOCUMENTS

| | | | |
|---|---|---|---|
| 6,005,694 A | 12/1999 | Liu | |
| 7,180,913 B2* | 2/2007 | Benvenuti | .............. H04J 3/1611 370/506 |
| 9,729,231 B2* | 8/2017 | Kim | ...................... H04L 1/0036 |
| 10,396,897 B1* | 8/2019 | Malave | ............ H04B 10/07955 |
| 2003/0011855 A1 | 1/2003 | Fujiwara | |

(Continued)

FOREIGN PATENT DOCUMENTS

| | | |
|---|---|---|
| CN | 101162944 A | 4/2008 |
| CN | 102223175 A | 10/2011 |

(Continued)

OTHER PUBLICATIONS

SFF-8472 Rev 12.4, Management Interface for SFP+, Mar. 31, 2021, Total 43 Pages.

*Primary Examiner* — Dalzid E Singh
(74) *Attorney, Agent, or Firm* — WOMBLE BOND DICKINSON (US) LLP (57) ABSTRACT

This application discloses an optical network system, a management device, an optical transmission apparatus, and a communications device, and belongs to the field of optical network technologies. A first communications device in the optical network system is configured to send physical information of the first communications device to a second communications device, where the physical information includes first module information of a first optical transmission apparatus. The second communications device is configured to determine a working status of the optical network system based on the first module information, second module information of a second optical transmission apparatus, and link information of an optical fiber link.

22 Claims, 5 Drawing Sheets

(56) References Cited

U.S. PATENT DOCUMENTS

| | | | |
|---|---|---|---|
| 2004/0136708 A1* | 7/2004 | Woolf | H04B 17/15 |
| | | | 398/22 |
| 2006/0051088 A1 | 3/2006 | Lee et al. | |
| 2011/0008049 A1* | 1/2011 | Tanonaka | H04J 14/0275 |
| | | | 398/79 |
| 2012/0099867 A1 | 4/2012 | Hotta et al. | |
| 2016/0323539 A1 | 11/2016 | Michihata | |
| 2019/0281373 A1* | 9/2019 | Sadasivarao | H04L 41/046 |

FOREIGN PATENT DOCUMENTS

| | | |
|---|---|---|
| CN | 101505191 B | 7/2012 |
| CN | 102684781 A | 9/2012 |
| CN | 104601228 A | 5/2015 |
| CN | 106936510 A | 7/2017 |
| CN | 108900251 A | 11/2018 |
| CN | 208924244 U | 5/2019 |
| CN | 209419625 U | 9/2019 |
| CN | 110719128 A | 1/2020 |
| CN | 112448772 A | 3/2021 |
| JP | H0456539 A | 2/1992 |
| JP | 2001045053 A | 2/2001 |
| JP | 2007067482 A | 3/2007 |
| JP | 2015050624 A | 3/2015 |
| JP | 2017103510 A | 6/2017 |
| WO | 2010101001 A1 | 9/2010 |
| WO | 2020001626 A1 | 1/2020 |
| WO | 2020198433 A1 | 10/2020 |

* cited by examiner

OPTICAL NETWORK SYSTEM, MANAGEMENT DEVICE, OPTICAL TRANSMISSION APPARATUS, AND COMMUNICATIONS DEVICE

CROSS-REFERENCE TO RELATED APPLICATION

This application claims priority to Chinese Patent Application No. 202111248581.7, filed on Oct. 26, 2021, and Chinese Patent Application No. 202111481708.X, file on Dec. 6, 2021, which are incorporated herein by reference in their entireties.

TECHNICAL FIELD

This application relates to the field of optical network technologies, and in particular, to an optical network system, a management device, an optical transmission apparatus, and a communications device.

BACKGROUND

Two communications devices in an optical network system are connected through an optical fiber link. Each communications device includes an optical module. The optical module of the communications device is configured to convert to-be-transmitted data on the communications device into an optical signal, and then transmit the optical signal to an optical module of the other communications device by using the optical fiber link, to implement data transmission in the optical network system.

With increasing expansion of a scale of the optical network system, it is more difficult to manage the optical network system. How to implement convenient O&M management for the optical network system is an urgent problem to be resolved currently.

SUMMARY

This application provides an optical network system, a management device, an optical transmission apparatus, and a communications device, to implement convenient O&M management for the optical network system.

According to a first aspect, an optical network system is provided, including: a first communications device, a second communications device, and an optical fiber link. The first communications device includes a first optical transmission apparatus. The second communications device includes a second optical transmission apparatus. The first optical transmission apparatus is connected to the second optical transmission apparatus through the optical fiber link. The first communications device is configured to send physical information of the first communications device to the second communications device, where the physical information includes first module information of the first optical transmission apparatus. The second communications device is configured to determine a working status of the optical network system based on the first module information, second module information of the second optical transmission apparatus, and link information of an optical fiber link.

In this application, one communications device in the optical network system obtains module information of optical transmission apparatuses in two communications devices and link information of an optical fiber link between the two communications devices, and determines a working status of the optical network system based on the information. In this way, O&M personnel can learn of the overall working status of the optical network system by using one communications device, and further determine whether the optical network system is faulty and a specific fault location based on the working status of the optical network system, thereby improving convenience of O&M management for the optical network system.

In an embodiment, the module information of the optical transmission apparatus includes but is not limited to one or more of a transmission rate of the optical transmission apparatus, an optical wavelength, a type of the optical transmission apparatus, a manufacturer of the optical transmission apparatus, transmit power of the optical transmission apparatus, receive power of the optical transmission apparatus, a temperature of the optical transmission apparatus, or a life warning of the optical transmission apparatus.

In an embodiment, the link information of the optical fiber link includes link status information and link performance information. The link status information includes but is not limited to one or more of a length of the optical fiber link, stress on the optical fiber link, breakpoint information, insertion loss, reflection information, or environment information. The link performance information includes but is not limited to one or more of a pre-correction/post-correction bit error rate, a signal-to-noise ratio, and multi-path interference feature information.

In an embodiment, the first optical transmission apparatus includes an auxiliary channel modulation unit and a transmitter. The second optical transmission apparatus includes an auxiliary channel demodulation unit and a receiver. The transmitter in the first optical transmission apparatus is connected to the receiver in the second optical transmission apparatus through the optical fiber link. The auxiliary channel modulation unit is configured to: modulate the physical information of the first communications device to obtain a target electrical signal, and transmit the target electrical signal to the transmitter. The transmitter is configured to: convert the target electrical signal into an optical signal, and transmit the optical signal to the optical fiber link. The receiver is configured to: convert the received optical signal into the target electrical signal, and transmit the target electrical signal to the auxiliary channel demodulation unit. The auxiliary channel demodulation unit is configured to demodulate the target electrical signal, to obtain the physical information of the first communications device.

In this application, a function of transferring data other than service data between the optical transmission apparatuses is implemented by using the auxiliary channel modulation unit and the auxiliary channel modulation/demodulation unit.

In an embodiment, the auxiliary channel modulation unit is configured to modulate the physical information of the first communications device on a service signal by using a pilot tone modulation technology, to obtain the target electrical signal. The physical information of the first communications device is a pilot tone signal. Alternatively, the auxiliary channel modulation unit is configured to modulate the physical information of the first communications device on an idle frame byte of a service signal by using a frame insertion technology, to obtain the target electrical signal. The two implementations do not affect normal transmission of the service signal.

In an embodiment, the first optical transmission apparatus is a first optical module, and the first communications device further includes a first network device connected to the first optical module. Alternatively, the first communications device includes a first network device, and the first optical transmission apparatus is integrated into the first network device. The second optical transmission apparatus is a second optical module, and the second communications device further includes a second network device connected to the second optical module. Alternatively, the second communications device includes a second network device, and the second optical transmission apparatus is integrated into the second network device.

In other words, the optical transmission apparatus in the communications device may be an independent optical module, or may be integrated into the network device. When the optical transmission apparatus is integrated into the network device, the network device is the communications device.

In an embodiment, the second optical transmission apparatus is an optical module, the second communications device further includes a second network device connected to the second optical transmission apparatus, and the second network device or the second optical transmission apparatus includes a processing unit. The processing unit is configured to determine the working status of the optical network system based on the first module information, the second module information, and the link information of the optical fiber link.

In an embodiment, the optical network system further includes a management device. The second communications device is further configured to send the working status of the optical network system to the management device. The management device is further configured to display the working status of the optical network system.

In this application, the management device displays the working status of the optical network system, thereby visualizing the working status of the optical network system and facilitating analysis and management of O&M personnel for the optical network system. The working status of the optical fiber link can reflect a link status and link performance of the optical fiber link, so that the O&M personnel can perform fault detection and fault locating on the optical fiber link, thereby improving convenience of O&M management.

In an embodiment, the physical information of the first communications device further includes the link information of the optical fiber link.

In an embodiment, the physical information of the first communications device includes link status information of the optical fiber link, and the first communications device includes a sensing unit. The sensing unit is configured to detect the link status information of the optical fiber link.

In an embodiment, the sensing unit includes an optical time domain reflectometer.

In an embodiment, the physical information of the first communications device includes link performance information of the optical fiber link, and the first communications device includes a feature extraction unit. The feature extraction unit is configured to obtain the link performance information of the optical fiber link based on a signal received through the optical fiber link.

According to a second aspect, another optical network system is provided, including: a management device, a first communications device, a second communications device, and an optical fiber link. The first communications device includes a first optical transmission apparatus. The second communications device includes a second optical transmission apparatus. The first optical transmission apparatus is connected to the second optical transmission apparatus through the optical fiber link. The first communications device and the second communications device are separately connected to the management device. The first communications device is configured to send physical information of the first communications device to the management device, where the physical information of the first communications device includes first module information of the first optical transmission apparatus. The second communications device is configured to send physical information of the second communications device to the management device, where the physical information of the second communications device includes second module information of the second optical transmission apparatus. The physical information of the first communications device and/or the physical information of the second communications device further include/includes link information of the optical fiber link. The management device is configured to determine a working status of the optical network system based on the first module information, the second module information, and the link information of the optical fiber link.

In this application, the management device in the optical network system obtains module information of optical transmission apparatuses in two or more communications devices and link information of an optical fiber link between the communications devices, and determines a working status of the optical network system based on the information. In this way, O&M personnel can learn of the overall working status of the optical network system by using the management device, and further determine whether the optical network system is faulty and a specific fault location based on the working status of the optical network system, thereby improving convenience of O&M management for the optical network system.

In an embodiment, the first communications device includes a first network device. The second communications device includes a second network device. The first network device is configured to send the physical information of the first communications device to the management device. The second network device is configured to send the physical information of the second communications device to the management device.

Optionally, the management device is further configured to display the working status of the optical network system.

In this application, the management device displays the working status of the optical network system, thereby visualizing the working status of the optical network system and facilitating analysis and management of O&M personnel for the optical network system. The working status of the optical fiber link can reflect a link status and link performance of the optical fiber link, so that the O&M personnel can perform fault detection and fault locating on the optical fiber link, thereby improving convenience of O&M management.

In an embodiment, the working status of the optical network system includes at least two of a working status of the first optical transmission apparatus, a working status of the second optical transmission apparatus, and a working status of the optical fiber link.

According to a third aspect, a management device is provided. The management device includes an obtaining unit and a processing unit. The obtaining unit is configured to obtain first physical information of a first communications device and second physical information of a second communications device. The first communications device includes a first optical transmission apparatus. The physical information of the first communications device includes first module information of the first optical transmission apparatus. The second communications device includes a second optical transmission apparatus. The physical information of the second communications device includes second module information of the second optical transmission apparatus.

The second communications device is connected to the first communications device through an optical fiber link. The physical information of the first communications device and/or the physical information of the second communications device further include/includes link information of the optical fiber link. The processing unit is configured to determine a working status of an optical network system based on the first module information, the second module information, and the link information of the optical fiber link, where the optical network system includes the first communications device, the second communications device, and the optical fiber link.

In this application, the management device can obtain module information of optical transmission apparatuses in two or more communications devices and link information of an optical fiber link between the communications devices, and determines a working status of the optical network system based on the information. In this way, O&M personnel can learn of the overall working status of the optical network system by using the management device, and further determine whether the optical network system is faulty and a specific fault location based on the working status of the optical network system, thereby improving convenience of O&M management for the optical network system.

In an embodiment, the first physical information and the second physical information that are obtained by the management device may be uniformly sent by one communications device of the first communications device and the second communications device, or may be separately sent by the first communications device and the second communications device.

In an embodiment, the obtaining unit includes a first receiving unit and a second receiving unit. The first receiving unit is configured to receive the physical information of the first communications device that is sent by the first communications device. The second receiving unit is configured to receive the physical information of the second communications device that is sent by the second communications device.

In an embodiment, the management device further includes a display unit, configured to display the working status of the optical network system.

In this application, the management device can display the working status of the optical network system, thereby visualizing the working status of the optical network system and facilitating analysis and management of O&M personnel for the optical network system. The working status of the optical fiber link can reflect a link status and link performance of the optical fiber link, so that the O&M personnel can perform fault detection and fault locating on the optical fiber link, thereby improving convenience of O&M management.

In an embodiment, the working status of the optical network system includes at least two of a working status of the first optical transmission apparatus, a working status of the second optical transmission apparatus, and a working status of the optical fiber link.

According to a fourth aspect, a method for determining a working status of an optical network system is provided. A management device obtains physical information of a first communications device and physical information of a second communications device. The first communications device includes a first optical transmission apparatus. The physical information of the first communications device includes first module information of the first optical transmission apparatus. The second communications device includes a second optical transmission apparatus. The physical information of the second communications device includes second module information of the second optical transmission apparatus. The second communications device is connected to the first communications device through an optical fiber link. The physical information of the first communications device and/or the physical information of the second communications device further include/includes link information of the optical fiber link. The management device determines a working status of the optical network system based on the first module information, the second module information, and the link information of the optical fiber link, where the optical network system includes the first communications device, the second communications device, and the optical fiber link.

In an embodiment, an implementation in which the management device obtains the physical information of the first communications device and the physical information of the second communications device includes: receiving, by the management device, the physical information of the first communications device that is sent by the first communications device. The management device further receives the physical information of the second communications device that is sent by the second communications device.

According to a fifth aspect, another method for determining a working status of an optical network system is provided. A first communications device obtains first physical information of the first communications device, where the first communications device includes a first optical transmission apparatus, and the first physical information includes module information of the first optical transmission apparatus. The first communications device receives second physical information of a second communications device that is sent by the second communications device, where the second communications device includes a second optical transmission apparatus, and the second physical information includes second module information of the second optical transmission apparatus. The first communications device determines a working status of the optical network system based on the first module information, the second module information, and link information of an optical fiber link. The optical network system includes the first communications device, the second communications device, and the optical fiber link. The first optical transmission apparatus is connected to the second optical transmission apparatus through the optical fiber link. The first physical information and/or the second physical information further include/includes the link information of the optical fiber link.

According to a sixth aspect, an optical transmission apparatus is provided. The optical transmission apparatus is a first optical transmission apparatus, and the optical transmission apparatus includes: an obtaining unit, configured to obtain first physical information of a first communications device, where the first communications device includes the first optical transmission apparatus, and the first physical information includes first module information of the first optical transmission apparatus; an auxiliary channel modulation unit, configured to modulate the first physical information to obtain a first electrical signal; and a transmitter, configured to: convert the first electrical signal into a first optical signal, and send the first optical signal to a second optical transmission apparatus through an optical fiber link.

In an embodiment, the optical transmission apparatus further includes: a receiver, configured to: receive a second optical signal sent by the second optical transmission apparatus through the optical fiber link, and convert the second optical signal into a second electrical signal; an auxiliary channel demodulation unit, configured to demodulate the second electrical signal to obtain second physical information of a second communications device, where the second communications device includes the second optical transmission apparatus, and the second physical information includes second module information of the second optical transmission apparatus; and a processing unit, configured to determine a working status of the optical network system based on the first module information, the second module information and link information of an optical fiber link, where the optical network system includes the first communications device, the second communications device, and the optical fiber link, and the first physical information and/or the second physical information further include/includes the link information of the optical fiber link.

In an embodiment, the obtaining unit includes a sensing unit, configured to detect link status information of the optical fiber link. The first physical information further includes link status information of the optical fiber link.

In an embodiment, the obtaining unit includes a feature extraction unit, configured to obtain link performance information of the optical fiber link based on a signal received through the optical fiber link. The first physical information further includes the link performance information of the optical fiber link.

In an embodiment, the auxiliary channel modulation unit is configured to modulate the first physical information on a service signal by using a pilot tone modulation technology, to obtain a target electrical signal. The first physical information is a pilot tone signal.

Alternatively, the auxiliary channel modulation unit is configured to modulate the first physical information on an idle frame byte of a service signal by using a frame insertion technology, to obtain a target electrical signal.

According to a seventh aspect, a communications device is provided, including the optical transmission apparatus according to the sixth aspect and any implementation of the sixth aspect.

In an embodiment, the communications device further includes a communications unit, configured to send first physical information to a management device.

According to an eighth aspect, a computer-readable storage medium is provided. The computer-readable storage medium stores instructions. When the instructions are executed by a processor, the method according to any one of the fourth aspect or the fifth aspect and the implementations of the fourth aspect or the fifth aspect is implemented.

According to a ninth aspect, a computer program product is provided, including a computer program. When the computer program is executed by a processor, the method according to any one of the fourth aspect or the fifth aspect and the implementations of the fourth aspect or the fifth aspect is implemented.

According to a tenth aspect, a chip is provided. The chip includes a programmable logic circuit and/or program instructions. When the chip runs, the method according to any one of the fourth aspect or the fifth aspect and the implementations of the fourth aspect or the fifth aspect is implemented.

DESCRIPTION OF EMBODIMENTS

To make objectives, technical solutions, and advantages of this application clearer, the following further describes implementations of this application in detail with reference to accompanying drawings.

With the advent of the 5G era and explosive growth of video, game, and smart terminal services, service traffic increases rapidly. As a result, acceleration and capacity expansion of an optical network system are inevitable. To ensure reliability and stability of the optical network system, routine O&M management is required. With increasing expansion of a scale of the optical network system, O&M requirements of the optical network system are increasingly high.

The optical network system includes a plurality of communications devices. Each communications device includes an optical transmission apparatus. Optical transmission apparatuses in two communications devices are connected to one another through an optical fiber link, to implement communication between the two communications devices. Currently, the optical transmission apparatus in the communications device can only monitor whether a working status thereof becomes abnormal, and send an alarm when the working status becomes abnormal. However, in an actual application scenario, that a working status of an optical transmission apparatus becomes abnormal may be caused by a fault of the optical transmission apparatus, or may be caused by a fault of an optical fiber link connected to the optical transmission apparatus, or even may be caused by a fault of a peer optical transmission apparatus. Therefore, after receiving the alarm, O&M personnel may need to perform troubleshooting in the entire optical network system to locate a specific fault location, and it is relatively difficult to perform O&M management on the optical network system.

Based on this, embodiments of this application provide a technical solution. A communications device or a management device obtains module information of optical transmission apparatuses in two or more communications devices and link information of optical fiber links between the communications devices, and determines a working status of an optical network system based on the information. In this way, O&M personnel can learn of the overall working status of the optical network system by using one device, and further determine, based on the working status of the optical network system, whether the optical network system is faulty and a specific fault location, thereby improving convenience of O&M management for the optical network system.

The following describes in detail an optical network system provided in an embodiment of this application.

Figure 1:
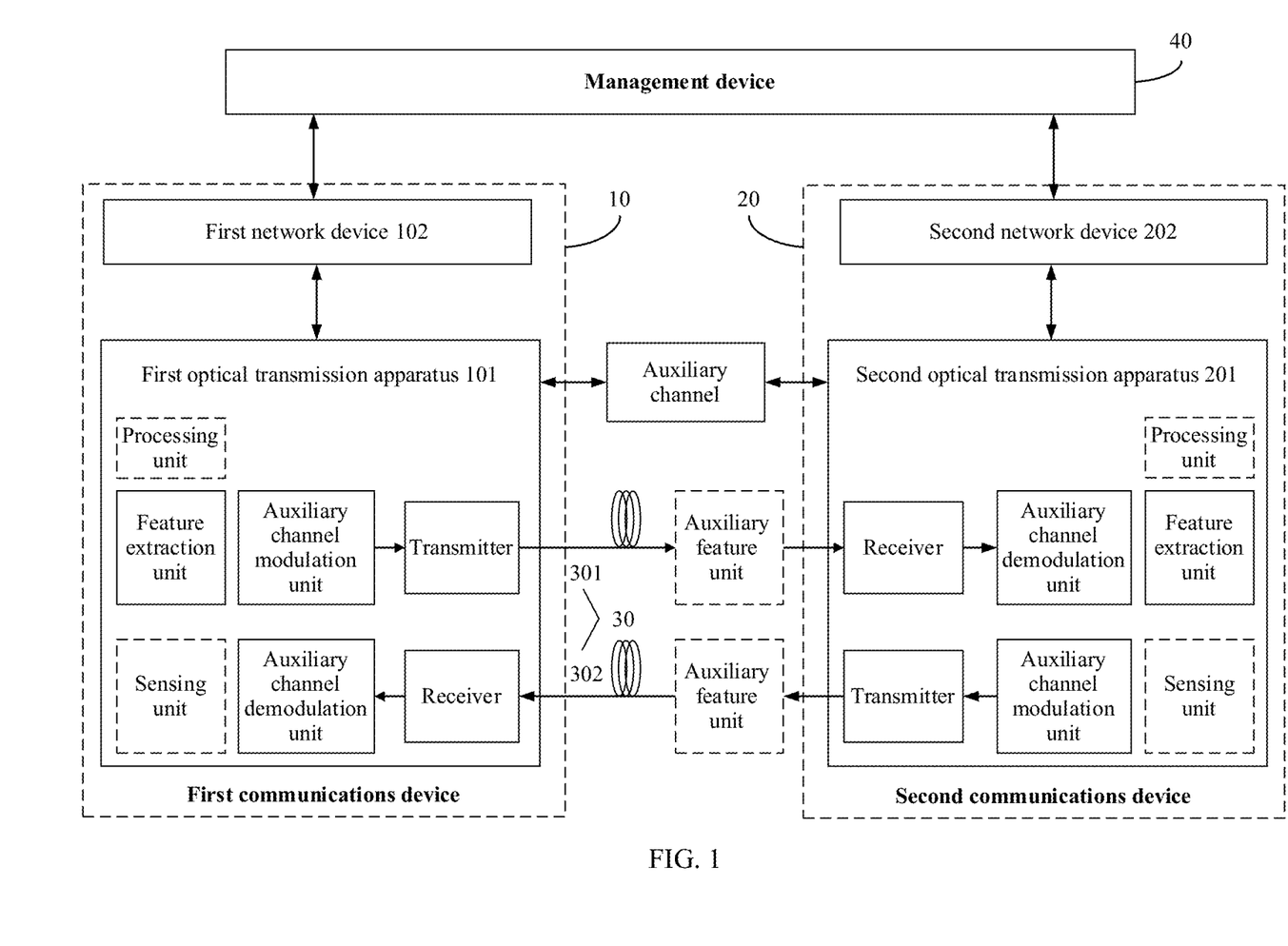
FIG. 1 is a schematic diagram of a structure of an optical network system according to an embodiment of this application.

FIG. 1 is a schematic diagram of a structure of an optical network system according to an embodiment of this application. As shown in FIG. 1, the optical network system includes a first communications device 10, a second communications device 20, and an optical fiber link 30. Each communications device includes an optical transmission apparatus and a network device. For example, the first communications device 10 includes a first optical transmission apparatus 101 and a first network device 102. The second communications device 20 includes a second optical transmission apparatus 201 and a second network device 202. The first optical transmission apparatus 101 is connected to the second optical transmission apparatus 201 through the optical fiber link 30.

In an embodiment, the network device may be a forwarding device such as a router, a switch, or a gateway.

Figure 2:
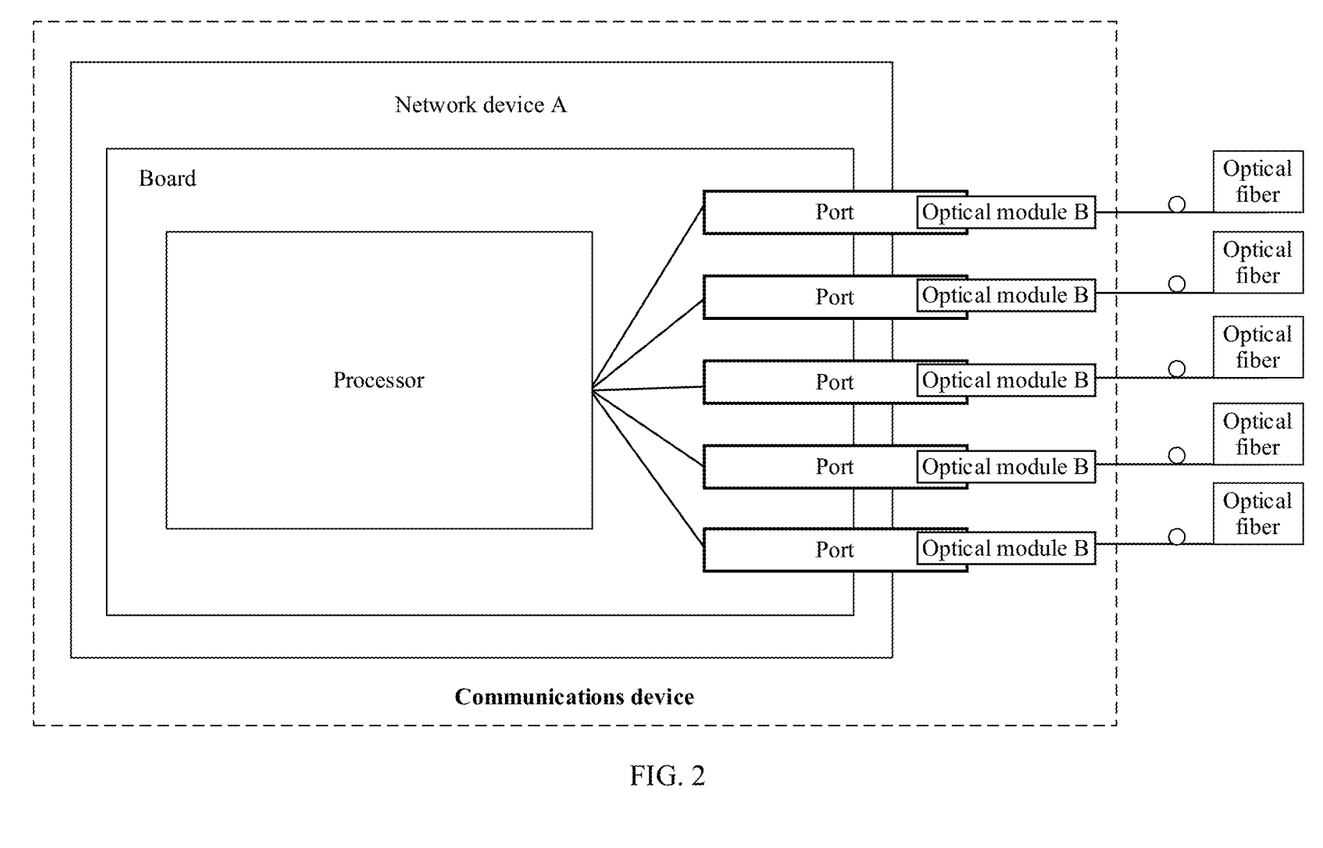
FIG. 2 is a schematic diagram of a structure of a communications device according to an embodiment of this application.

In some embodiments, the optical transmission apparatus is an independent optical module. In this implementation, the communications device includes the network device and the optical module. For example, FIG. 2 is a schematic diagram of a structure of a communications device according to an embodiment of this application. As shown in FIG. 2, the communications device includes a network device A and optical modules B. One or more boards (one board is shown in FIG. 2) are disposed in the network device A. Each board includes a processor and a plurality of ports. One end of the optical module B is inserted into one port on the board, and the other end is connected to an optical fiber. Optionally, the board includes but is not limited to a service board, a line card, or a line processing unit.

In some other embodiments, the optical transmission apparatus is integrated into the network device. In this implementation, the communications device means the network device integrated with the optical transmission apparatus. The optical transmission apparatus may be integrated on a board of the network device. For a function of the optical transmission apparatus, refer to a function of the optical module. Details are not described in this embodiment of this application.

In FIG. 1, an example in which the optical transmission apparatus is an independent optical module is used for schematic description.

Refer to FIG. 1. The optical transmission apparatus includes a transmitter and a receiver. The transmitter is configured to transmit an optical signal, and the receiver is configured to receive an optical signal. Optionally, the optical fiber link 30 includes one or more optical fibers, that is, the first optical transmission apparatus 101 may be connected to the second optical transmission apparatus 201 through one or more optical fibers. For example, refer to FIG. 1. The optical fiber link 30 includes an optical fiber 301 and an optical fiber 302. A transmitter of the first optical transmission apparatus 101 is connected to a receiver of the second optical transmission apparatus 201 through the optical fiber 301, and a receiver of the first optical transmission apparatus 101 is connected to a transmitter of the second optical transmission apparatus 201 through the optical fiber 302. Correspondingly, the transmitter of the first optical transmission apparatus 101 is configured to transmit an optical signal to the receiver of the second optical transmission apparatus 201 through the optical fiber 301, and the receiver of the first optical transmission apparatus 101 is configured to receive, through the optical fiber 302, an optical signal transmitted by the transmitter of the second optical transmission apparatus 201. The transmitter of the second optical transmission apparatus 201 is configured to transmit an optical signal to the receiver of the first optical transmission apparatus 101 through the optical fiber 302, and the receiver of the second optical transmission apparatus 201 is configured to receive, through the optical fiber 301, an optical signal transmitted by the transmitter of the first optical transmission apparatus 101. Alternatively, one optical fiber is used to connect the transmitter of the first optical transmission apparatus 101 to the receiver of the second optical transmission apparatus 201 and connect the receiver of the first optical transmission apparatus 101 to the transmitter of the second optical transmission apparatus 201. This is not limited in this embodiment of this application.

Still refer to FIG. 1. The optical transmission apparatus further includes an auxiliary channel modulation unit and an auxiliary channel demodulation unit. The auxiliary channel modulation unit is configured to modulate a non-service signal such as management information, control information, or a physical feature parameter other than a service signal. Correspondingly, the auxiliary channel demodulation unit is configured to demodulate a non-service signal. One auxiliary channel may be implemented based on an auxiliary channel modulation unit in the first optical transmission apparatus 101 and an auxiliary channel demodulation unit in the second optical transmission apparatus 201, and is used by the first optical transmission apparatus 101 for transmitting a non-service signal to the second optical transmission apparatus 201. Similarly, another auxiliary channel may be implemented based on an auxiliary channel modulation unit in the second optical transmission apparatus 201 and an auxiliary channel demodulation unit in the first optical transmission apparatus 101, and is used by the second optical transmission apparatus 201 for transmitting a non-service signal to the first optical transmission apparatus 101. The auxiliary channel modulation unit and the auxiliary channel demodulation unit in one optical transmission apparatus may be one unit (referred to as an auxiliary channel modulation/demodulation unit), or may be different units.

In an embodiment, an auxiliary channel between two optical transmission apparatuses is implemented based on an optical fiber link connecting the two optical transmission apparatuses. For example, in the optical network system shown in FIG. 1, an auxiliary channel between the first optical transmission apparatus 101 and the second optical transmission apparatus 102 is implemented based on the optical fiber link 30. That is, the auxiliary channel and a traffic channel may share one physical link. In this embodiment of this application, the auxiliary channel between the two optical transmission apparatuses may be any communications channel that can transmit a non-service signal between two communications devices.

In an embodiment, the auxiliary channel modulation/demodulation unit may implement the auxiliary channel by using a pilot tone modulation technology, for example, may implement the auxiliary channel by using a light sensor (LS) pilot tone modulation technology. A specific modulation manner includes amplitude modulation/amplitude demodulation, phase modulation/phase demodulation, and the like. For example, the auxiliary channel modulation unit may modulate a non-service signal on a service signal for transmission by using the pilot tone modulation technology, that is, modulate the non-service signal into a pilot tone signal. Correspondingly, the auxiliary channel demodulation unit can obtain the non-service signal by demodulating the received pilot tone signal. In this implementation, the non-service signal and the service signal coexist in a transmission process.

Alternatively, the auxiliary channel modulation/demodulation unit may implement the auxiliary channel by using a frame insertion technology, for example, may implement the auxiliary channel in a forward error correction (FEC) frame insertion manner. For example, the auxiliary channel modulation unit may insert a non-service signal into an idle frame byte of a service signal for transmission by using the frame insertion technology. Correspondingly, the auxiliary channel demodulation unit can obtain the non-service signal by extracting and demodulating the corresponding byte in the received signal. In this implementation, the non-service signal and the service signal do not interfere with each other in a transmission process. Alternatively, the auxiliary channel modulation unit may insert a non-service signal into a reserved field of a training sequence frame for transmission by using the frame insertion technology. Correspondingly, the auxiliary channel demodulation unit can obtain the non-service signal by demodulating the reserved field of the received training sequence frame. The training sequence frame is usually transmitted before the service signal is transmitted.

In an embodiment, the auxiliary channel modulation/demodulation unit may be an independent modulation/demodulation unit, or may be integrated with a modulation/demodulation unit corresponding to a service signal. This is not limited in this embodiment of this application.

In this embodiment of this application, in addition to the auxiliary channel implemented between the optical transmission apparatuses, auxiliary channels are implemented between units inside the optical transmission apparatus, between the optical transmission apparatus and the network device, and between the network device and the management device. Data other than service data may be transmitted through the auxiliary channels.

The communications device further includes a sensing unit. Optionally, the sensing unit may be deployed in the optical transmission apparatus. For example, refer to FIG. 1. Alternatively, the sensing unit may be implemented by adding an external sensor to the communications device. The transmission sensing unit in the communications device is configured to detect link status information of the optical fiber link connected to the optical transmission apparatus in the communications device. The link status information includes but is not limited to one or more of a length of the optical fiber link, stress on the optical fiber link, breakpoint information, insertion loss, reflection information, or environment information. The breakpoint information reflects whether there is a breakpoint on the optical fiber link, a location of the breakpoint, and the like. The insertion loss means signal loss caused by insertion of a cable or a component between the transmitter and the receiver, and usually means attenuation. The insertion loss is expressed in decibels corresponding to a received signal level. The reflection information reflects a quantity and locations of reflection points, reflection magnitude, and the like on the optical fiber link. The environment information includes a temperature of an environment in which the optical fiber link is located, a vibration amplitude of the optical fiber link, and the like.

In an embodiment, the sensing unit may be implemented by using an optical time domain reflectometer (OTDR), for example, the OTDR may be integrated inside the optical transmission apparatus. Alternatively, the sensing unit may be an independent sensor device. A principle of detecting the link status information of the optical fiber link based on the sensor device is as follows: The optical fiber link is used as a sensor, and based on optical effects such as interference, Rayleigh scattering, Raman scattering, or Brillouin scattering of light on the optical fiber link, an optical time domain reflection technology is used to measure, analyze, monitor, and locate a peripheral physical quantity (such as vibration, stress, a temperature, and structural damage) of the optical fiber link.

Figure 3:
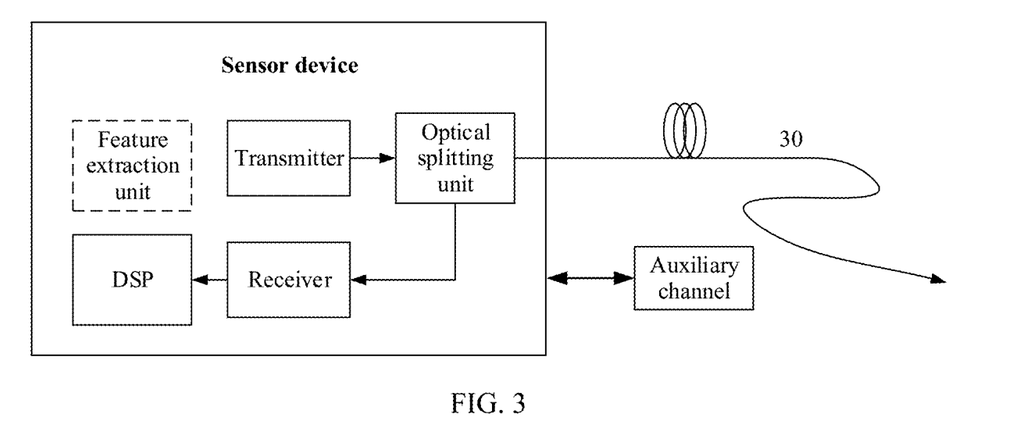
FIG. 3 is a schematic diagram of a structure of a sensor device according to an embodiment of this application.

For example, FIG. 3 is a schematic diagram of a structure of a sensor device according to an embodiment of this application. As shown in FIG. 3, the sensor device includes a transmitter, a receiver, an optical splitting unit, and a digital signal processing (DSP) unit. The transmitter and the receiver are separately connected to an optical fiber link 30 by using the optical splitting unit. The digital signal processing unit is connected to the receiver. The optical splitting unit is configured to transmit a reflected optical signal to the receiver. The reflected optical signal is an optical signal reflected back by the optical fiber link 30 when an optical signal transmitted by the transmitter is transmitted on the optical fiber link 30. The receiver is configured to convert the reflected optical signal into an electrical signal, and transmit the electrical signal to the signal processing unit. The digital signal processing unit is configured to extract a signal feature of the reflected optical signal based on the received electrical signal, and perform analysis based on the extracted signal feature to obtain link status information of the optical fiber link. The signal feature includes a phase, intensity, and a frequency of backscattered light. In an embodiment, the sensor device further includes a feature extraction unit. The feature extraction unit is configured to obtain link performance information of the optical fiber link based on a signal received through the optical fiber link. The link performance information includes but is not limited to one or more of a pre-correction/post-correction bit error rate (BER), a signal-to-noise ratio (SNR), and multi-path interference (MPI) feature information. The MPI feature information may be obtained by using an MPI detection algorithm. In an embodiment, whether the optical fiber link has an MPI risk may be determined by observing parameters such as level-dependent noise and low-frequency lifting of a received signal. The sensor device may further send the collected link information of the optical fiber link to a peer communications device, a local network device, or a local optical transmission apparatus through an auxiliary channel.

The communications device further includes a feature extraction unit. Optionally, the feature extraction unit may be deployed in the optical transmission apparatus. For example, refer to FIG. 1. Alternatively, the feature extraction unit may be deployed in the network device. Alternatively, the feature extraction unit may be deployed in an independently disposed sensor device. For example, refer to FIG. 3. Alternatively, the feature extraction unit may be deployed in two or more of the optical transmission apparatus, the network device, and the sensor device in a distributed manner. The feature extraction unit is configured to obtain link performance information of the optical fiber link based on a signal received through the optical fiber link. The feature extraction unit is further configured to extract module information of the local optical transmission apparatus. Optionally, the module information of the optical transmission apparatus includes but is not limited to one or more of a transmission rate of the optical transmission apparatus, an optical wavelength, a type of the optical transmission apparatus, a manufacturer of the optical transmission apparatus, transmit power of the optical transmission apparatus, receive power of the optical transmission apparatus, a temperature of the optical transmission apparatus, or a life warning of the optical transmission apparatus.

Link performance of one optical fiber link in different transmission directions may be different, and the link performance information of the optical fiber link in a direction from a transmitter-side communications device to a receiver-side communications device may be obtained by the receiver-side communications device based on a received signal. In a case that different optical fibers are used in receiving and transmitting directions, link information of each optical fiber may be obtained by a receiver-side communications device corresponding to the optical fiber and then sent to a transmitter-side communications device corresponding to the optical fiber.

A feature extraction unit in the receiver-side communications device is further configured to extract a feature parameter from a signal demodulated by an auxiliary channel demodulation unit. The feature parameter includes but is not limited to module information of an optical transmission apparatus in the transmitter-side communications device and/or link status information of the optical fiber link.

In an embodiment, the feature extraction unit may be integrated with a DSP unit or a microcontroller unit (MCU) (not shown in FIG. 1), or may be an independent unit.

In an embodiment, the communications device further includes a processing unit. Optionally, the processing unit may be deployed in the optical transmission apparatus. For example, refer to FIG. 1. Alternatively, the processing unit may be deployed in the network device. The processing unit is configured to determine a working status of the optical network system based on the information extracted by the feature extraction unit. In an embodiment, the working status of the optical network system includes at least two of a working status of an optical transmission apparatus in a local communications device, a working status of an optical transmission apparatus in the peer communications device, and a working status of an optical fiber link between the local communications device and the peer communications device. Further, the processing unit may further perform fault diagnosis, report or deliver a control instruction, and the like based on the working status of the optical network system. The working status of the optical transmission apparatus may include whether the optical transmission apparatus is faulty, a specific fault type, and the like. The working status of the optical fiber link may include whether the optical fiber link is faulty, a specific fault location, and the like.

In an embodiment, the processing unit may be integrated with a DSP unit or an MCU (not shown in FIG. 1), or may be an independent unit. The processing unit in the communications device is not necessary. For example, in some application scenarios, the communications device does not need to use the processing unit to process and analyze the obtained information, but directly reports the obtained information to the management device. In this application scenario, the processing unit does not need to be deployed in the communications device.

In an embodiment, the optical network system further includes an auxiliary feature unit. For example, still refer to FIG. 1. The auxiliary feature unit may be deployed on the optical fiber link. The auxiliary feature unit is configured to identify the optical fiber link. In a scenario in which a transmit end has a plurality of transmitters and/or a receive end has a plurality of receivers, link information of optical fiber links between different transmitters and one receiver, between one transmitter and different receivers, and between different transmitters and different receivers can be distinguished by deploying auxiliary feature units at intersection locations of the optical fiber links. This helps the sensing unit, the feature extraction unit, and the like to extract link information of an optical fiber link between a specific transmitter and a specific receiver.

In an embodiment, still refer to FIG. 1. The optical network system further includes a management device 40. The management device 40 is configured to manage and control the network device. For example, refer to FIG. 1. The first network device 102 and the second network device 202 are separately connected to the management device 40.

In an embodiment, the management device 40 is one server, or a server cluster including a plurality of servers, or a cloud platform.

In an embodiment, the management device 40 is configured to display the working status of the optical network system, to visualize the working status of the optical network system, and facilitate analysis and management of O&M personnel for the optical network system.

In some embodiments, the communications device is responsible for collecting the module information of the local optical transmission apparatus, module information of the peer optical transmission apparatus, and link information of an optical fiber link between the local optical transmission apparatus and the peer optical transmission apparatus, and determining the working status of the optical network system based on the collected information. Then, the communications device sends the working status of the optical network system to the management device. The management device displays the received working status of the optical network system.

In some other embodiments, the communications device is responsible for collecting the module information of the local optical transmission apparatus, and may further collect the link information of the optical fiber link between the local optical transmission apparatus and the peer optical transmission apparatus, and then send the collected information to the management device. The management device determines the working status of the optical network system based on the received module information of the two optical transmission apparatuses having a communication connection relationship and the link information of the optical fiber link between the two optical transmission apparatuses, and displays the working status of the optical network system.

In the optical network system shown in FIG. 1, either the first communications device 10 or the second communications device 20 may serve as a transmit end to send an optical signal, and correspondingly, the other may serve as a receive end to receive the optical signal. In this application, function implementation of the optical network system is described in the following two embodiments by using an example in which the first communications device 10 is the transmit end and the second communications device 20 is the receive end.

In an embodiment of this application, a first communications device 10 is configured to send physical information of the first communications device 10 to a second communications device 20. The physical information includes first module information of a first optical transmission apparatus 101. The second communications device 20 is configured to determine a working status of an optical network system based on the first module information, second module information of a second optical transmission apparatus 201, and link information of an optical fiber link 30.

In an embodiment, the working status of the optical network system includes at least two of a working status of the first optical transmission apparatus 101, a working status of the second optical transmission apparatus 201, and a working status of the optical fiber link 30.

In this embodiment of this application, one communications device obtains module information of optical transmission apparatuses in two communications devices and link information of an optical fiber link between the two communications devices, and determines a working status of the optical network system based on the information. In this way, O&M personnel can learn of the overall working status of the optical network system by using one communications device, and further determine whether the optical network system is faulty and a specific fault location based on the working status of the optical network system, thereby improving convenience of O&M management for the optical network system.

In an embodiment, the link information includes link status information and link performance information. The link information of the optical fiber link 30 may be collected by the first communications device 10 and then sent to the second communications device 20. In other words, the physical information of the first communications device 10 may further include the link information of the optical fiber link 30. Alternatively, link information of the optical fiber link 30 may be collected by the second communications device 20. Alternatively, a part (for example, link performance information) of the link information of the optical fiber link 30 is collected by the first communications device 10 and then sent to the second communications device 20, and the other part (for example, link status information) is collected by the second communications device 20.

In an embodiment, the physical information of the first communications device 10 that is sent by the first communications device 10 to the second communications device 20 includes the link status information of the optical fiber link 30, and a sensing unit in the first communications device 10 is further configured to detect the link status information of the optical fiber link 30. The physical information of the first communications device 10 that is sent by the first communications device 10 to the second communications device 20 includes the link performance information of the optical fiber link 30, and a feature extraction unit in the first communications device 10 is further configured to obtain the link performance information of the optical fiber link 30 based on a signal received through the optical fiber link 30.

In an embodiment, refer to FIG. 1. The first optical transmission apparatus 101 includes an auxiliary channel modulation unit and a transmitter. The second optical transmission apparatus 201 includes an auxiliary channel demodulation unit and a receiver. The auxiliary channel modulation unit in the first optical transmission apparatus 101 is configured to: modulate the physical information of the first communications device 10 to obtain a target electrical signal, and transmit the target electrical signal to the transmitter in the first optical transmission apparatus 101. The transmitter is configured to: convert the target electrical signal into an optical signal, and transmit the optical signal to the optical fiber link 30. The receiver in the second optical transmission apparatus 201 is configured to: convert the received optical signal into the target electrical signal, and transmit the target electrical signal to the auxiliary channel demodulation unit in the second optical transmission apparatus 201. The auxiliary channel demodulation unit is configured to demodulate the target electrical signal, to obtain the physical information. Optionally, the target electrical signal includes a service signal and the physical information of the first communications device 10.

In an embodiment, the auxiliary channel modulation unit in the first optical transmission apparatus 101 is configured to modulate the physical information of the first communications device 10 on the service signal by using a pilot tone modulation technology, to obtain the target electrical signal, where the physical information is a pilot tone signal. Correspondingly, the auxiliary channel demodulation unit in the second optical transmission apparatus 201 is configured to demodulate the pilot tone signal in the received target electrical signal to obtain the physical information of the first communications device 10.

In another embodiment, the auxiliary channel modulation unit in the first optical transmission apparatus 101 is configured to modulate the physical information of the first communications device 10 on an idle frame byte of the service signal by using a frame insertion technology, to obtain the target electrical signal. Correspondingly, the auxiliary channel demodulation unit in the second optical transmission apparatus 201 is configured to: extract the corresponding byte in the received target electrical signal and perform demodulation to obtain the physical information of the first communications device 10.

In an embodiment, the second optical transmission apparatus 201 is an optical module. The second network device 202 or the second optical transmission apparatus 201 includes a processing unit. The processing unit is configured to determine the working status of the optical network system based on the first module information, the second module information, and the link information of the optical fiber link 30.

In this embodiment of this application, the optical transmission apparatus in the communications device may perform only receiving and transmitting operations, and the network device performs a processing operation. Alternatively, in a case in which the optical transmission apparatus is an independent optical module, the optical transmission apparatus may perform both receiving and transmitting operations and a processing operation. The processing operation includes determining the working status of the optical network system, and the like.

In an embodiment, in a case in which the optical network system includes the management device 40, the second communications device 20 is further configured to: after determining the working status of the optical network system, send the working status of the optical network system to the management device 40. The management device 40 is further configured to display the working status of the optical network system. The second communications device 20 sends the working status of the optical network system to the management device 40 by using the second network device 202.

In this embodiment of this application, the management device displays the working status of the optical network system, thereby visualizing the working status of the optical network system and facilitating analysis and management of O&M personnel for the optical network system. The working status of the optical fiber link can reflect a link status and link performance of the optical fiber link, so that the O&M personnel can perform fault detection and fault locating on the optical fiber link, thereby improving convenience of O&M management.

In another embodiment of this application, an optical network system includes a management device 40. A first communications device 10 is configured to send physical information of the first communications device 10 to the management device 40, where the physical information of the first communications device 10 includes first module information of a first optical transmission apparatus 101. A second communications device 20 is configured to send physical information of the second communications device 20 to the management device 40, where the physical information of the second communications device 20 includes second module information of a second optical transmission apparatus 201. The physical information of the first communications device 10 and/or the physical information of the second communications device 20 further include/includes link information of an optical fiber link 30. The management device 40 is configured to determine a working status of the optical network system based on the first module information, the second module information, and the link information of the optical fiber link 30.

In an embodiment, the working status of the optical network system includes at least two of a working status of the first optical transmission apparatus 101, a working status of the second optical transmission apparatus 201, and a working status of the optical fiber link 30. For a manner in which the communications device collects the module information of the optical transmission apparatus of the communications device and the link information of the optical fiber link, refer to the related descriptions in the foregoing embodiment. Details are not described herein again.

In this embodiment of this application, a management device obtains module information of optical transmission apparatuses in two or more communications devices and link information of an optical fiber link between the communications devices, and determines a working status of the optical network system based on the information. In this way, O&M personnel can learn of the overall working status of the optical network system by using the management device, and further determine whether the optical network system is faulty and a specific fault location based on the working status of the optical network system, thereby improving convenience of O&M management for the optical network system.

In an embodiment, a first network device 102 in the first communications device 10 is configured to send the physical information of the first communications device 10 to the management device 40. The second network device 202 in the second communications device 20 is configured to send the physical information of the second communications device 20 to the management device 40.

In an embodiment, the management device 40 is further configured to display the working status of the optical network system.

In this embodiment of this application, the management device displays the working status of the optical network system, thereby visualizing the working status of the optical network system and facilitating analysis and management of O&M personnel for the optical network system. The working status of the optical fiber link can reflect a link status and link performance of the optical fiber link, so that the O&M personnel can perform fault detection and fault locating on the optical fiber link, thereby improving convenience of O&M management.

Figure 4:
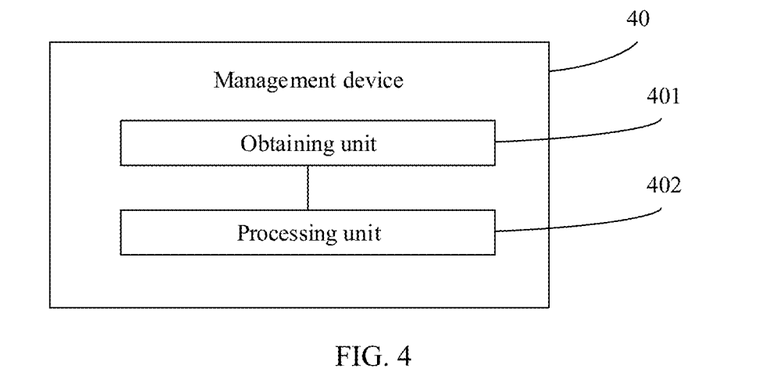
FIG. 4 is a schematic diagram of a structure of a management device according to an embodiment of this application.

An embodiment of this application further provides a management device. The management device may be, for example, the management device 40 in any one of the foregoing optical network systems. For example, FIG. 4 is a schematic diagram of a structure of a management device according to an embodiment of this application. As shown in FIG. 4, the management device 40 includes an obtaining unit 401 and a processing unit 402.

The obtaining unit 401 is configured to obtain physical information of a first communications device and physical information of a second communications device. The first communications device includes a first optical transmission apparatus. The physical information of the first communications device includes first module information of the first optical transmission apparatus. The second communications device includes a second optical transmission apparatus. The physical information of the second communications device includes second module information of the second optical transmission apparatus. The second communications device is connected to the first communications device through an optical fiber link. The physical information of the first communications device and/or the physical information of the second communications device further include/includes link information of the optical fiber link.

The processing unit 402 is configured to determine a working status of an optical network system based on the first module information, the second module information, and the link information of the optical fiber link.

In an embodiment, the obtaining unit 401 includes a first receiving unit and a second receiving unit. The first receiving unit is configured to receive the physical information of the first communications device that is sent by the first communications device. The second receiving unit is configured to receive the physical information of the second communications device that is sent by the second communications device.

Figure 5:
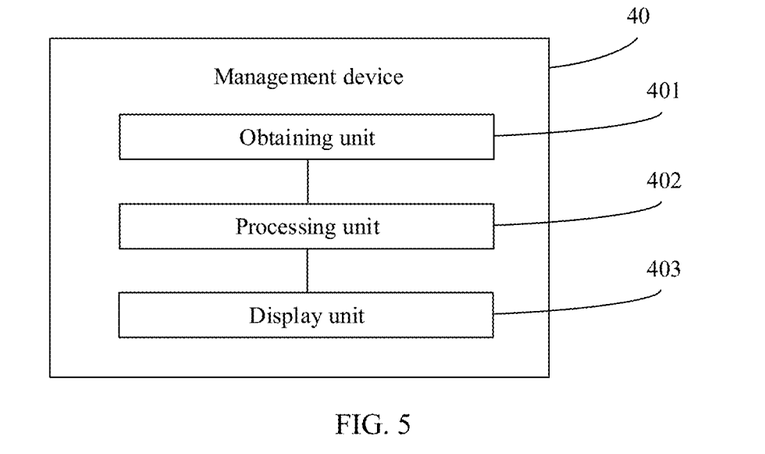
FIG. 5 is a schematic diagram of a structure of another management device according to an embodiment of this application.

In an embodiment, as shown in FIG. 5, the management device 40 further includes: a display unit 403, configured to display the working status of the optical network system.

In an embodiment, the working status of the optical network system includes at least two of a working status of the first optical transmission apparatus, a working status of the second optical transmission apparatus, and a working status of the optical fiber link.

A management device provided in this embodiment of this application can obtain module information of optical transmission apparatuses in two or more communications devices and link information of an optical fiber link between the communications devices, and determines a working status of an optical network system based on the information. In this way, O&M personnel can learn of the overall working status of the optical network system by using the management device, and further determine whether the optical network system is faulty and a specific fault location based on the working status of the optical network system, thereby improving convenience of O&M management for the optical network system. In addition, the management device can further display the working status of the optical network system, thereby visualizing the working status of the optical network system and facilitating analysis and management of O&M personnel for the optical network system. The working status of the optical fiber link can reflect a link status and link performance of the optical fiber link, so that the O&M personnel can perform fault detection and fault locating on the optical fiber link, thereby improving convenience of O&M management.

In this embodiment, a specific manner of performing an operation by each unit in the management device has been described in detail in the related embodiment of the optical network system. Details are not described herein again.

Figure 6:
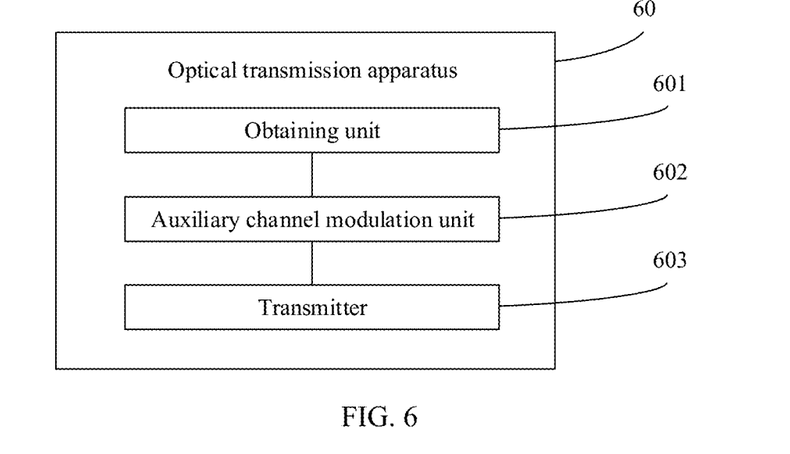
FIG. 6 is a schematic diagram of a structure of an optical transmission apparatus according to an embodiment of this application.

An embodiment of this application further provides an optical transmission apparatus. The optical transmission apparatus is a first optical transmission apparatus. The optical transmission apparatus may be, for example, the first optical transmission apparatus 101 or the second optical transmission apparatus 201 in any one of the foregoing optical network systems. For example, FIG. 6 is a schematic diagram of a structure of a communications apparatus according to an embodiment of this application. As shown in FIG. 6, the optical transmission apparatus 60 includes:

an obtaining unit 601, configured to obtain first physical information of a first communications device, where the first communications device includes a first optical transmission apparatus, and the first physical information includes first module information of the first optical transmission apparatus;

an auxiliary channel modulation unit 602, configured to modulate the first physical information to obtain a first electrical signal; and a transmitter 603, configured to: convert the first electrical signal into a first optical signal, and send the first optical signal to a second optical transmission apparatus through an optical fiber link.

Figure 7:
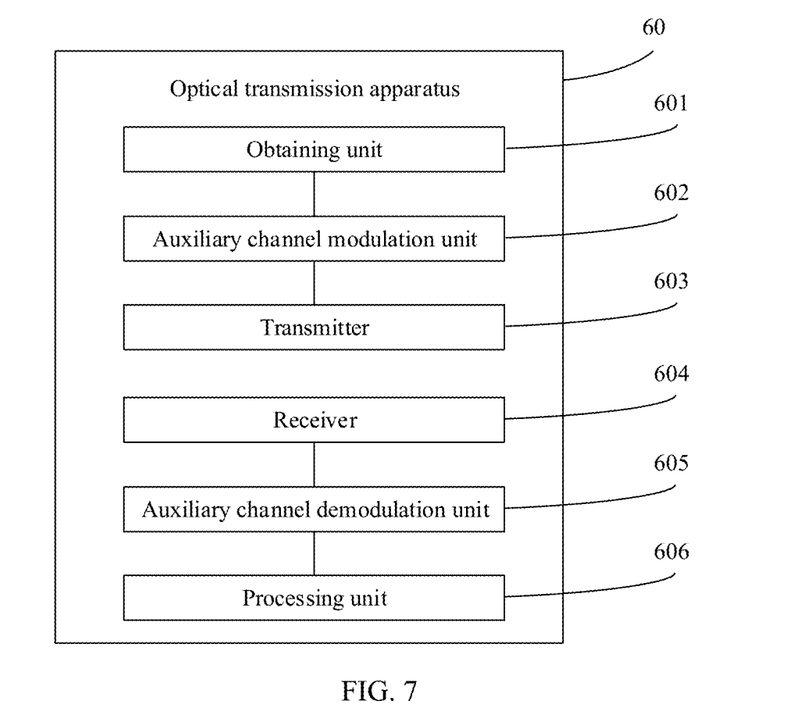
FIG. 7 is a schematic diagram of a structure of another optical transmission apparatus according to an embodiment of this application.

In an embodiment, as shown in FIG. 7, an optical transmission apparatus 60 further includes: a receiver 604, configured to: receive a second optical signal sent by a second optical transmission apparatus through an optical fiber link, and convert the second optical signal into a second electrical signal; an auxiliary channel demodulation unit 605, configured to demodulate the second electrical signal to obtain second physical information of a second communications device, where the second communications device includes a second optical transmission apparatus, and the second physical information includes second module information of the second optical transmission apparatus; and a processing unit 606, configured to determine a working status of an optical network system based on the first module information, the second module information and link information of the optical fiber link, where the optical network system includes the first communications device, the second communications device, and the optical fiber link, and the first physical information and/or the second physical information further include/includes the link information of the optical fiber link.

In an embodiment, the obtaining unit 601 includes a sensing unit, configured to detect link status information of the optical fiber link. The first physical information further includes link status information of the optical fiber link.

In an embodiment, the obtaining unit 601 includes a feature extraction unit, configured to obtain link performance information of the optical fiber link based on a signal received through the optical fiber link. The first physical information further includes the link performance information of the optical fiber link.

In an embodiment, the auxiliary channel modulation unit 602 is configured to modulate the first physical information on a service signal by using a pilot tone modulation technology, to obtain a target electrical signal. The first physical information is a pilot tone signal.

Alternatively, the auxiliary channel modulation unit 602 is configured to modulate the first physical information on an idle frame byte of a service signal by using a frame insertion technology, to obtain a target electrical signal.

A specific manner of performing an operation by each unit in the optical module apparatus in this embodiment has been described in detail in the related embodiment of the optical network system. Details are not described herein again.

Figure 8:
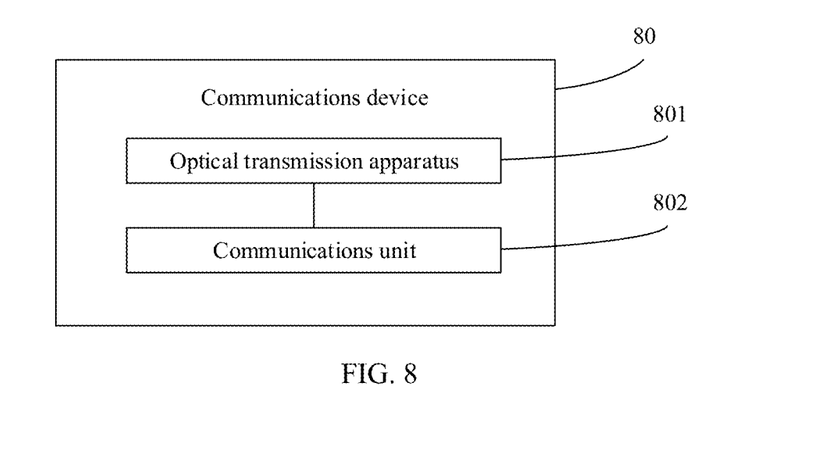
FIG. 8 is a schematic diagram of a structure of another communications device according to an embodiment of this application.

An embodiment of this application further provides a communications device. The communications device may be, for example, the first communications device 10 or the second communications device 20 in any one of the foregoing optical network systems. For example, FIG. 8 is a schematic diagram of a structure of a communications device according to an embodiment of this application. As shown in FIG. 8, the communications device 80 includes an optical transmission apparatus 801. The optical transmission apparatus 801 may be the optical transmission apparatus 60 shown in FIG. 6 or FIG. 7.

In an embodiment, still refer to FIG. 8. The communications device 80 further includes a communications unit 802, configured to send first physical information to a management device. The communications device 80 includes a network device, and the communications unit 802 is a unit that can be configured to communicate with the management device in the network device.

An embodiment of this application further provides a method for determining a working status of an optical network system. A management device obtains physical information of a first communications device and physical information of a second communications device. The first communications device includes a first optical transmission apparatus. The physical information of the first communications device includes first module information of the first optical transmission apparatus. The second communications device includes a second optical transmission apparatus. The physical information of the second communications device includes second module information of the second optical transmission apparatus. The second communications device is connected to the first communications device through an optical fiber link. The physical information of the first communications device and/or the physical information of the second communications device further include/includes link information of the optical fiber link. The management device determines a working status of the optical network system based on the first module information, the second module information, and the link information of the optical fiber link, where the optical network system includes the first communications device, the second communications device, and the optical fiber link.

In this embodiment of this application, first physical information and second physical information that are obtained by the management device may be uniformly sent by one communications device of the first communications device and the second communications device, or may be separately sent by the first communications device and the second communications device.

In an embodiment, an implementation in which the management device obtains the physical information of the first communications device and the physical information of the second communications device includes: receiving, by the management device, the physical information of the first communications device that is sent by the first communications device. The management device further receives the physical information of the second communications device that is sent by the second communications device.

For a specific manner of performing an operation by the management device in the embodiment, refer to descriptions in the structure embodiments of the management device and the related embodiment of the optical network system. Details are not described herein again.

An embodiment of this application further provides another method for determining a working status of an optical network system. A first communications device obtains first physical information of the first communications device, where the first communications device includes a first optical transmission apparatus, and the first physical information includes module information of the first optical transmission apparatus. The first communications device receives second physical information of a second communications device that is sent by the second communications device, where the second communications device includes a second optical transmission apparatus, and the second physical information includes second module information of the second optical transmission apparatus. The first communications device determines a working status of the optical network system based on the first module information, the second module information, and link information of an optical fiber link. The optical network system includes the first communications device, the second communications device, and the optical fiber link. The first optical transmission apparatus is connected to the second optical transmission apparatus through the optical fiber link. The first physical information and/or the second physical information further include/includes the link information of the optical fiber link.

For a specific manner of performing an operation by the communications device in the embodiment, refer to descriptions in the structure embodiments of the communications device and the related embodiment of the optical network system. Details are not described herein again.

In the embodiments of this application, the terms "first", "second", and "third" are merely used for description, but cannot be understood as an indication or implication of relative importance.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are only optional embodiments of this application, but are not intended to limit this application. Any modification, equivalent replacement, or improvement made within the concept and principle of this application should fall within the protection scope of this application.

What is claimed is:

1. An optical network system, comprising:
   a first communications device having a first optical transmission apparatus; and
   a second communications device having a second optical transmission apparatus connected to the first optical transmission apparatus through an optical fiber link,
   wherein the first communications device is configured to send physical information of the first communications device to the second communications device, wherein the physical information comprises first module information of the first optical transmission apparatus, and
   wherein the second communications device is configured to determine a working status of the optical network system based on the first module information, second module information of the second optical transmission apparatus, and link information of the optical fiber link.

2. The optical network system according to claim 1, wherein the first optical transmission apparatus comprises a first processor and a transmitter, and the second optical transmission apparatus comprises a second processor and a receiver;
   the first processor is configured to: modulate the physical information to obtain a target electrical signal, and transmit the target electrical signal to the transmitter;
   the transmitter is configured to: convert the target electrical signal into an optical signal, and transmit the optical signal to the optical fiber link;
   the receiver is configured to: convert the received optical signal into the target electrical signal, and transmit the target electrical signal to the second processor; and
   the second processor is configured to demodulate the target electrical signal, to obtain the physical information.

3. The optical network system according to claim 2, wherein
   the first processor is configured to modulate the physical information on a service signal by using a pilot tone modulation technology, to obtain the target electrical signal, wherein the physical information is a pilot tone signal.

4. The optical network system according to claim 2, wherein
   the first processor is configured to modulate the physical information on an idle frame byte of a service signal by using a frame insertion technology, to obtain the target electrical signal.

5. The optical network system according claim 1, wherein the second optical transmission apparatus is an optical module, the second communications device further comprises a second network device connected to the second optical transmission apparatus, and the second network device or the second optical transmission apparatus comprises a third processor; and
   the third processor is configured to determine the working status of the optical network system based on the first module information, the second module information, and the link information.

6. The optical network system according to claim 1, a management device, wherein
   the second communications device is further configured to send the working status of the optical network system to the management device; and
   the management device is configured to display the working status of the optical network system.

7. The optical network system according to claim 1, wherein the physical information further comprises the link information of the optical fiber link.

8. The optical network system according to claim 7, wherein the link information comprises link status information, and wherein the first communications device comprises a fourth processor to detect the link status information of the optical fiber link.

9. The optical network system according to claim 8, wherein the link information comprises link performance information; and
   the fourth processor is further configured to obtain the link performance information of the optical fiber link based on a signal received through the optical fiber link.

10. An optical network system, comprising:
    a management device;
    a first communications device coupled to the management device, wherein the first communications device comprises a first optical transmission apparatus, wherein the first communications device is configured to send physical information of the first communications device to the management device, wherein the physical information of the first communications device comprises first module information of the first optical transmission apparatus; and
    a second communications device coupled to the management device, wherein the second communications device comprises a second optical transmission apparatus connected to the first optical transmission apparatus through an optical fiber link, wherein the second communications device is configured to send physical information of the second communications device to the management device, wherein the physical information of the second communications device comprises second module information of the second optical transmission apparatus, and at least one of the physical information of the first communications device or the physical information of the second communications device further comprises link information of the optical fiber link, and wherein the management device is configured to determine a working status of the optical network system based on the first module information, the second module information, and the link information of the optical fiber link.

11. The optical network system according to claim 10, wherein the first communications device comprises a first network device to send the physical information of the first communications device to the management device, and wherein the second communications device comprises a second network device to send the physical information of the second communications device to the management device.

12. The optical network system according to claim 10, wherein
the management device is further configured to display the working status of the optical network system.

13. The optical network system according to claim 12, wherein the working status of the optical network system comprises at least two of a working status of the first optical transmission apparatus, a working status of the second optical transmission apparatus, or a working status of the optical fiber link.

14. A management device, comprising:
a processor and a memory comprising instructions, which when executed by the processor, cause the management device to:
obtain physical information of a first communications device, wherein the first communications device comprises a first optical transmission apparatus, the physical information of the first communications device comprises first module information of the first optical transmission apparatus;
obtain physical information of a second communications device that is coupled to the first communications device through an optical fiber link, wherein the second communications device comprises a second optical transmission apparatus, the physical information of the second communications device comprises second module information of the second optical transmission apparatus, at least one of the physical information of the first communications device or the physical information of the second communications device further comprises link information of the optical fiber link; and
determine a working status of an optical network system based on the first module information, the second module information, and the link information of the optical fiber link, wherein the optical network system comprises the first communications device, the second communications device, and the optical fiber link.

15. The management device according to claim 14, wherein the instructions further cause the management device to receive the physical information of the first communications device that is sent by the first communications device; and
receive the physical information of the second communications device that is sent by the second communications device.

16. The management device according to claim 14, wherein the instructions further cause the management device to display the working status of the optical network system.

17. The management device according to claim 14, wherein the working status of the optical network system comprises at least two of a working status of the first optical transmission apparatus, a working status of the second optical transmission apparatus, or a working status of the optical fiber link.

18. An optical transmission apparatus, operating as a first optical transmission apparatus, comprising:
a processor configured to:
obtain first physical information of a first communications device, wherein the first communications device comprises the first optical transmission apparatus, and the first physical information comprises first module information of the first optical transmission apparatus, and
modulate the first physical information to obtain a first electrical signal; and
an interface configured to:
convert the first electrical signal into a first optical signal,
send the first optical signal to a second optical transmission apparatus through an optical fiber link, and
receive a second optical signal sent by the second optical transmission apparatus through the optical fiber link, and convert the second optical signal into a second electrical signal;
wherein the processor is further configured to:
demodulate the second electrical signal to obtain second physical information of a second communications device, wherein the second communications device comprises the second optical transmission apparatus, and the second physical information comprises second module information of the second optical transmission apparatus, and
determine a working status of an optical network system based on the first module information, the second module information, and link information of the optical fiber link, wherein the optical network system comprises the first communications device, the second communications device, and the optical fiber link, and at least one of the first physical information or the second physical information further comprises the link information of the optical fiber link.

19. The optical transmission apparatus according to claim 18, wherein the processor is configured to detect link status information of the optical fiber link, wherein the first physical information further comprises link status information of the optical fiber link.

20. The optical transmission apparatus according to claim 18, wherein the processor is configured to obtain link performance information of the optical fiber link based on a signal received through the optical fiber link, wherein the first physical information further comprises the link performance information of the optical fiber link.

21. The optical transmission apparatus according to claim 18, wherein the processor is configured to modulate the first physical information on a service signal by using a pilot tone modulation technology, to obtain the first electrical signal, wherein the first physical information is a pilot tone signal.

22. The optical transmission apparatus according to claim 18, wherein the processor is configured to modulate the first physical information on an idle frame byte of a service signal by using a frame insertion technology, to obtain the first electrical signal.

\* \* \* \* \*